(12) United States Patent
Morey

(10) Patent No.: US 10,788,000 B2
(45) Date of Patent: Sep. 29, 2020

(54) SYSTEM AND METHOD FOR ASPIRATING A PRE-CLEANER OF A WORK VEHICLE USING A DOUBLE-WALLED FLOW PIPE

(71) Applicant: CNH Industrial America, LLC, New Holland, PA (US)

(72) Inventor: Daniel Morey, Mundelein, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/077,018

(22) Filed: Mar. 22, 2016

(65) Prior Publication Data

US 2017/0276101 A1   Sep. 28, 2017

(51) Int. Cl.
| | | |
|---|---|---|
| *B01D 46/00* | (2006.01) | |
| *F02M 35/08* | (2006.01) | |
| *F02M 35/024* | (2006.01) | |
| *F02M 35/022* | (2006.01) | |
| *F01N 13/08* | (2010.01) | |
| *F02M 35/10* | (2006.01) | |
| *B01D 45/18* | (2006.01) | |
| *B01D 50/00* | (2006.01) | |
| *B01D 45/16* | (2006.01) | |

(52) U.S. Cl.
CPC ........... *F02M 35/086* (2013.01); *B01D 45/18* (2013.01); *B01D 46/0067* (2013.01); *B01D 50/002* (2013.01); *F01N 13/08* (2013.01); *F02M 35/022* (2013.01); *F02M 35/024* (2013.01); *F02M 35/10209* (2013.01); *B01D 45/16* (2013.01); *B01D 2279/60* (2013.01); *F01N 2470/30* (2013.01)

(58) Field of Classification Search
CPC .. F02M 35/022; F02M 35/024; F02M 35/086; F02M 35/1029; B01D 46/00; B01D 46/0067; B01D 2279/60; F01N 13/08; F01N 2470/30
USPC .......................................................... 95/279
See application file for complete search history.

(56) References Cited

U.S. PATENT DOCUMENTS 4,249,922 A * 2/1981 Saele ..................... B60K 13/02
  180/68.3
4,265,332 A   5/1981 Presnall et al.
(Continued)

FOREIGN PATENT DOCUMENTS

EP          1607597      12/2005
WO      WO 02/075127     9/2002

*Primary Examiner* — T. Bennett McKenzie
(74) *Attorney, Agent, or Firm* — Rickard K. DeMille; Rebecca L. Henkel

(57) ABSTRACT

A system for aspirating a pre-cleaner of a work vehicle may include a fluid conduit in flow communication with an outlet port of the pre-cleaner for receiving an aspirated airflow from the pre-cleaner. The system may also include a double-walled flow pipe having an inner tube that receives a primary fluid flow of the work vehicle. The double-walled flow pipe may also include an outer tube surrounding the inner tube such that an annular passage is defined between the inner and outer tubes. The annular passage may be in flow communication with the fluid conduit. When a vacuum is applied to the annular passage, the aspirated airflow may be drawn through the fluid conduit from the pre-cleaner and directed to the annular passage. The aspirated airflow flows through the annular passage as the primary fluid flow is being directed through the inner tube.

13 Claims, 4 Drawing Sheets

(56) References Cited

U.S. PATENT DOCUMENTS

| | | |
|---|---|---|
| 7,707,828 B2 | 5/2010 | Leseman et al. |
| 7,833,301 B2 | 11/2010 | Schindler et al. |
| 8,109,083 B2 | 2/2012 | Gibson et al. |
| 8,984,866 B2 | 3/2015 | Miebach et al. |
| 2011/0101683 A1 | 5/2011 | Reimann et al. |
| 2011/0258987 A1 | 10/2011 | Miebach et al. |
| 2012/0318602 A1 | 12/2012 | Bada Ghar Wala |
| 2014/0102483 A1 | 4/2014 | Hong et al. |

* cited by examiner

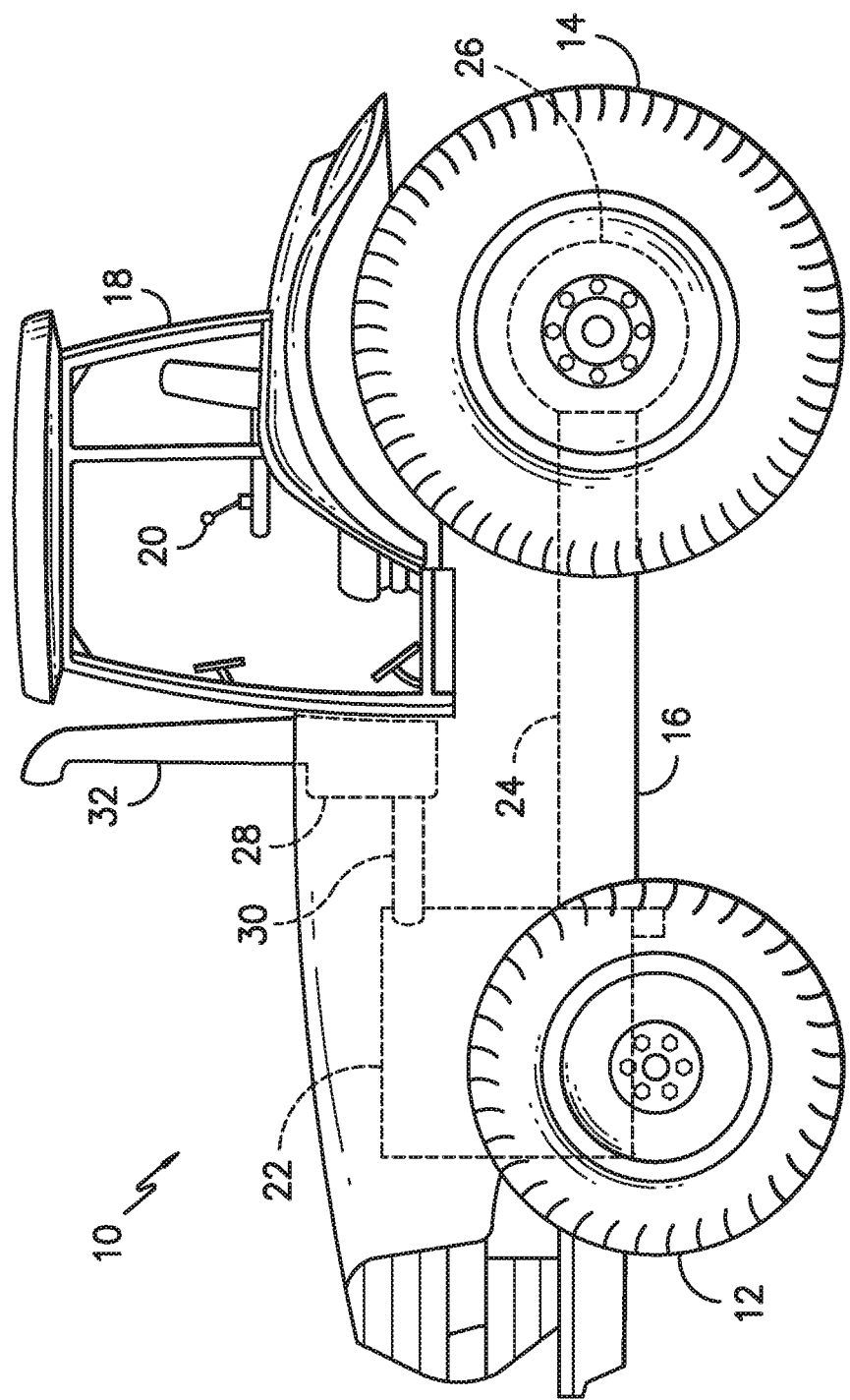
FIG. -1-

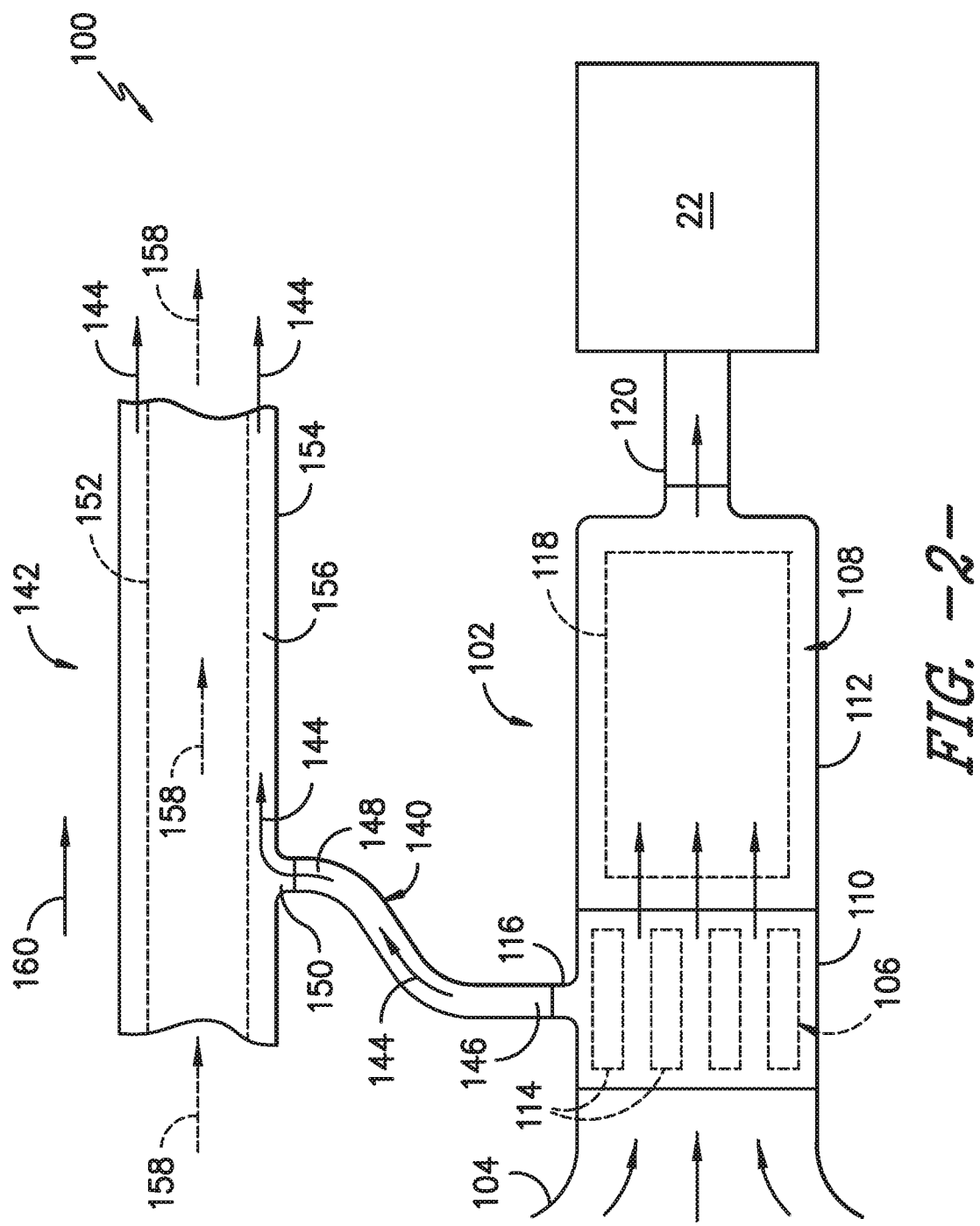
FIG. -2-

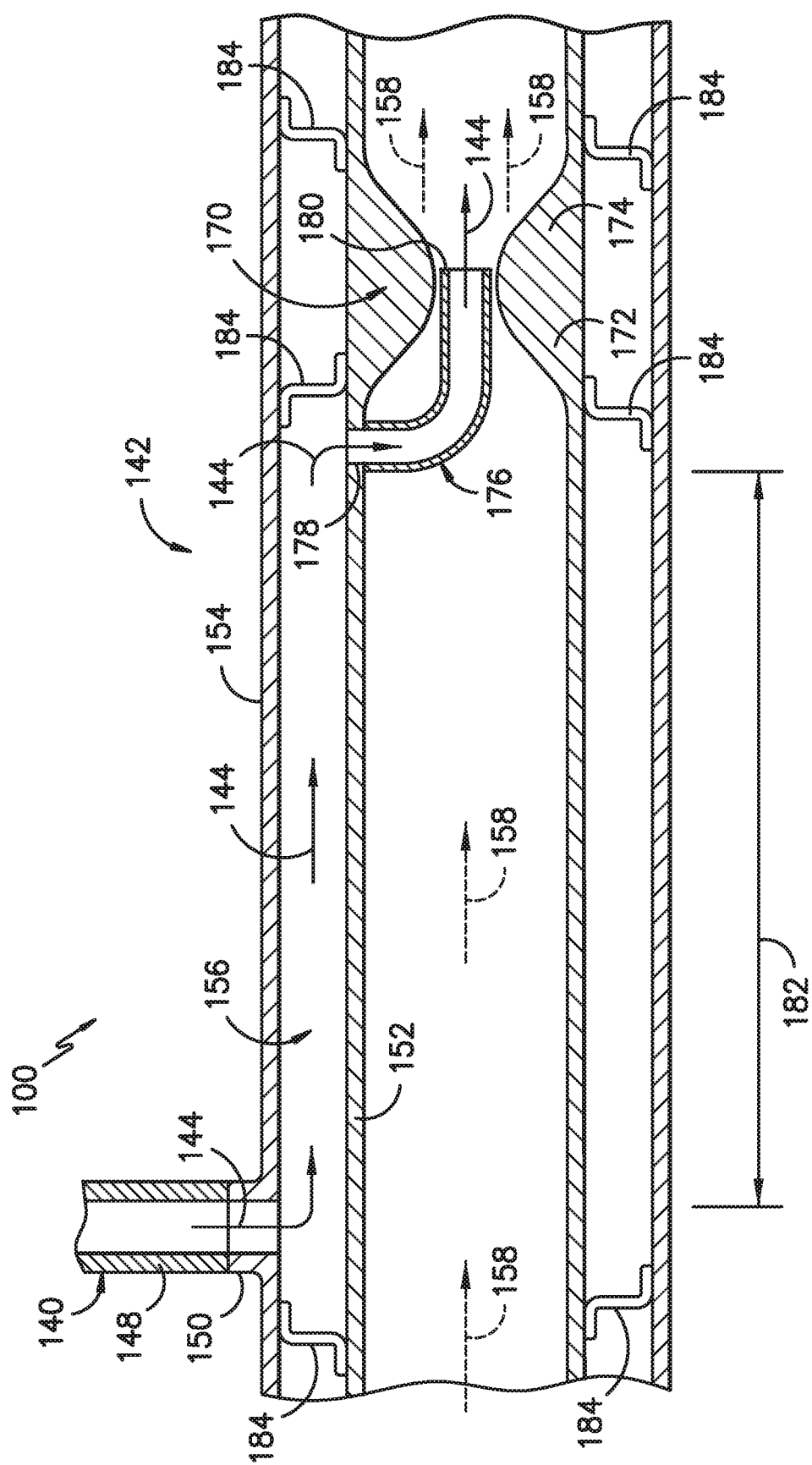
FIG. -3-

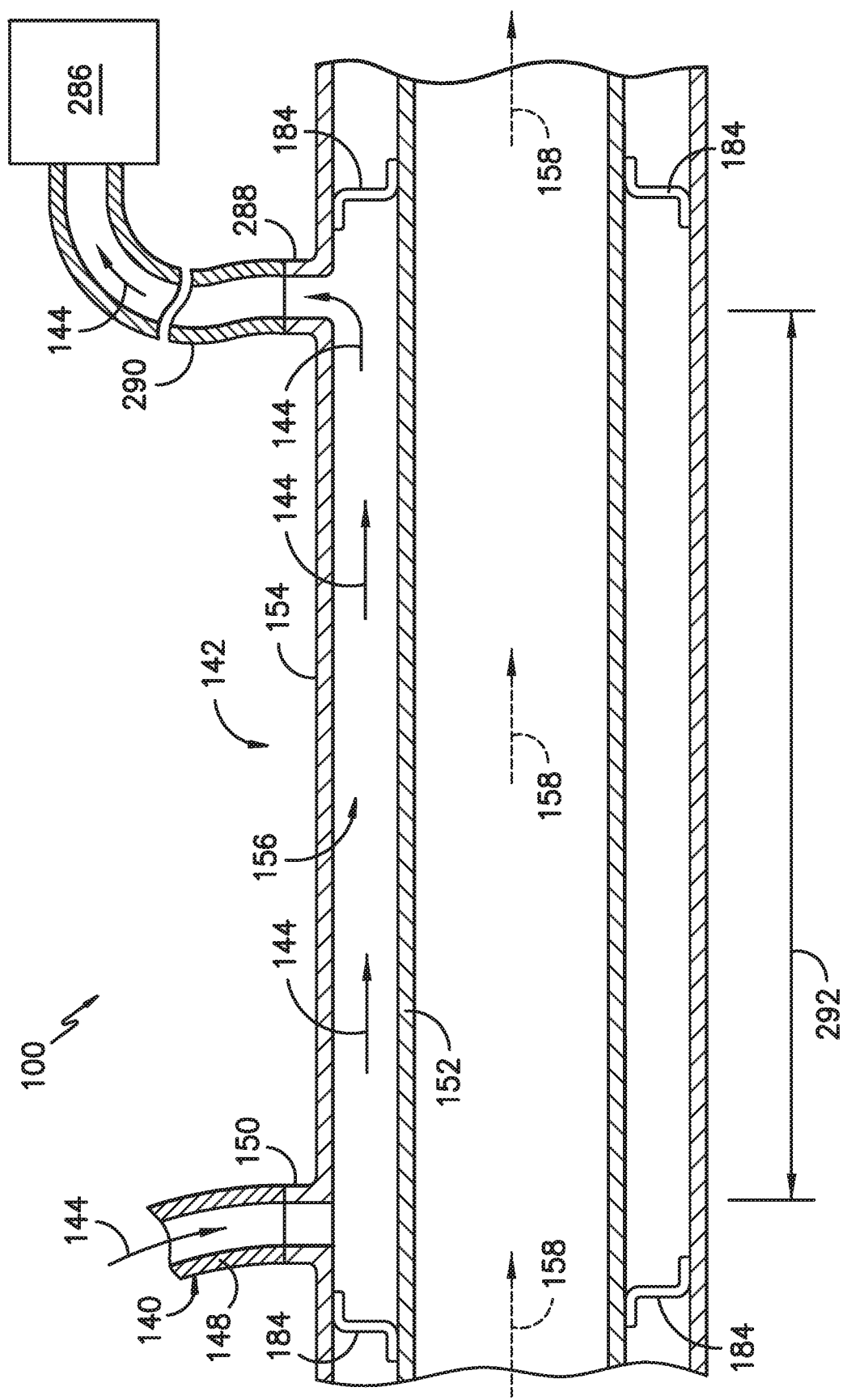
FIG. -4-

SYSTEM AND METHOD FOR ASPIRATING A PRE-CLEANER OF A WORK VEHICLE USING A DOUBLE-WALLED FLOW PIPE

FIELD OF THE INVENTION

The present subject matter relates generally to work vehicles and, more particularly, to a system and method for aspirating a pre-cleaner of a work vehicle using a dual-function, double-walled flow pipe for transporting an aspirated airflow from the pre-cleaner.

BACKGROUND OF THE INVENTION

Work vehicles typically include internal combustion engines that require clean air for use within the combustion process. Since many work vehicles, such as tractors and other agricultural vehicles, operate in fields and other harvesting environments in which the ambient air contains large amounts of dust, plant material and other particulates, an air intake system having an effective filter assembly is required. For example, conventional filter assemblies for work vehicles typically include a vortex or cyclone pre-cleaner configured to separate large particulates from the intake air and a porous air filter downstream of the pre-cleaner to provide the final stage of filtering prior to delivering the air into the engine.

To prevent the air filter from clogging, the large particulates separated from the intake air by the pre-cleaner must be removed from the filter assembly. Typically, such particulates are removed from the filter assembly via an outlet duct using a vacuum generated by the exhaust flow from the engine. However, to couple the outlet duct to the exhaust flow, one or more separate tubes and/or hoses must be provided between the filter assembly and the exhaust pipe through which the exhaust flow is being directed. Such tube(s)/hose(s) are often of considerable length and take up valuable packaging space within the interior of the work vehicle.

Accordingly, an improved system and method for aspirating a pre-cleaner of a work vehicle that allows for the number and/or length of the separate tube(s)/hose(s) coupled between the pre-cleaner and a vacuum source to be reduced would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for aspirating a pre-cleaner of a work vehicle. The system may generally include a fluid conduit configured to be in flow communication with an outlet port of the pre-cleaner for receiving an aspirated airflow from the pre-cleaner. The system may also include a double-walled flow pipe having an inner tube configured to receive a primary fluid flow of the work vehicle, wherein the primary fluid flow differs from the aspirated airflow. The double-walled flow pipe may also include an outer tube surrounding the inner tube such that an annular passage is defined between the inner and outer tubes. The annular passage may be in flow communication with the fluid conduit. When a vacuum is applied to the annular passage, the aspirated airflow may be drawn through the fluid conduit from the pre-cleaner and directed to the annular passage. The aspirated airflow flows through the annular passage as the primary fluid flow is being directed through the inner tube.

In another aspect, the present subject matter is directed to a system for aspirating a pre-cleaner of a work vehicle. The system may include a fluid conduit configured to be in flow communication with an outlet port of the pre-cleaner for receiving an aspirated airflow from the pre-cleaner. The system may also include a double-walled flow pipe having an inner tube configured to receive an exhaust flow of the work vehicle and an outer tube surrounding the inner tube such that an annular passage is defined between the inner and outer tubes. The inner tube may include a venturi section and the annular passage may be in flow communication with the fluid conduit. The double-walled flow pipe may also include a vacuum tube providing a flow path between the annular passage and the venturi section of the inner tube. When the exhaust flow is directed through the venturi section, a vacuum may be generated within the vacuum tube that draws the aspirated airflow through the fluid conduit to the annular passage. Thereafter, the aspirated airflow flows through the annular passage to the vacuum tube and may be expelled therefrom into the exhaust flow through the inner tube.

In a further aspect, the present subject matter is directed to a method for aspirating a pre-cleaner of a work vehicle. The method may include applying a vacuum to an annular passage of a double-walled flow pipe that is in fluid communication with an outlet of the pre-cleaner. The double-walled flow pipe may include an inner tube and an outer tube surrounding the inner tube such that the annular passage is defined between the inner and outer tubes. The inner tube may be configured to receive a primary fluid flow of the work vehicle. The method may also include generating an aspirated airflow via the vacuum that is directed from the outlet of the pre-cleaner to the annular passage and flows through the annular passage as the primary fluid flow is flowing through the inner tube.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle in accordance with aspects of the present subject matter;

FIG. 2 illustrates a schematic view of one embodiment of a system for aspirating a pre-cleaner of a work vehicle in accordance with aspects of the present subject matter, particularly illustrating the system including a dual-function, double-walled flow pipe configured to be provided in flow communication with the pre-cleaner;

FIG. 3 illustrates a cross-sectional view of one embodiment of a suitable configuration of a portion of the double-walled flow pipe shown in FIG. 2, particularly illustrating the double-walled flow pipe including a venturi section incorporated therein for generating a vacuum to be applied through the flow path defined between the venturi section and the pre-cleaner; and FIG. 4 illustrates a cross-sectional view of another embodiment of a suitable configuration of a portion of the double-walled flow pipe shown in FIG. 2, particularly illustrating the double-walled flow pipe forming a flow path for directing an aspirated airflow from the pre-cleaner to a downstream vacuum source.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for aspirating a pre-cleaner of a work vehicle. Specifically, in several embodiments, the system may include a double-walled flow pipe including concentric tubes (e.g., an inner tube and an outer tube) such that an inner flow path is defined by the inner tube and an outer flow path is formed within the annular passage defined between the inner and outer tubes. In such embodiments, a primary fluid flow of the work vehicle may be directed along the inner flow path (e.g., an exhaust gas flow or a liquid coolant flow) while an aspirated airflow from the pre-cleaner may be directed through the outer flow path. For instance, the annular passage defined between the inner and outer tubes may be provided in flow communication with an outlet port of the pre-cleaner via a fluid coupling. As such, by applying a vacuum to the annular passage and the fluid coupling, the particulates separated within the pre-cleaner may be expelled therefrom as an aspirated airflow and may flow through the fluid coupling and along the annular passage as the primary fluid flow is being directed through the inner flow path.

By providing the dual-function, double-walled flow pipe, the number and/or length of the hose(s)/tube(s) typically required in a conventional aspiration system may be reduced. For instance, by directing the aspirated airflow through the annular passage of the double-walled flow pipe a given lengthwise distance, a length(s) of any associated separate hose(s)/tube(s) of the system may be reduced a corresponding amount. As a result, the costs associated with the hose(s)/tube(s) may be reduced. In addition, the amount of packaging space occupied by such hose(s)/tube(s) within the work vehicle may be similarly reduced.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices 20 (e.g., levers, pedals, control panels and/or the like) for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential 26. The engine 22, transmission 24, and differential 26 may collectively define a drivetrain of the work vehicle 10.

Moreover, the work vehicle 10 may also include an exhaust treatment system 28 for reducing the amount emissions contained within the engine exhaust. For instance, engine exhaust expelled from the engine 22 may be directed through a first exhaust pipe 30 to the exhaust treatment system 28 to allow the levels of nitrous oxide (NOx) emissions contained within the exhaust to be reduced significantly. The cleaned exhaust gases may then be expelled from the exhaust treatment system 28 into the surrounding environment via a second exhaust pipe 32 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 22, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Referring now to FIG. 2, a schematic view of one embodiment of a system 100 for aspirating a pre-cleaner of a work vehicle 10 is illustrated in accordance with aspects of the present subject matter. In general, the system 100 will be described herein with reference to the work vehicle 10 shown in FIG. 1. However, it should be appreciated that the disclosed system 100 may generally be utilized with any suitable work vehicle having any suitable vehicle configuration.

As shown in FIG. 2, the system 100 may include or be associated with various components of an air intake system of the work vehicle 10. For example, the system 100 may include a filter assembly 102 configured to receive dirty air from an intake duct 104 and clean/filter such air for subsequent delivery to the engine 22. In general, the filter assembly 102 may include a pre-cleaner 106 and an air filter 108 disposed downstream of the pre-cleaner 106. In addition, the filter assembly 102 may include a pre-cleaner housing 110 configured to encase the pre-cleaner 106 and a filter housing 112 configured to encase the air filter 108. It should be appreciated that the pre-cleaner housing 110 and the filter housing 112 may be formed integrally with one another (e.g., by forming both housings 110, 112 as a single continuous housing) or the pre-cleaner housing 110 and the filter housing 112 may comprise separate components configured to be separately coupled to one another.

As is generally understood, the pre-cleaner 106 may be configured to remove portions of the dust, dirt, debris, plant matter and other particulates contained within the air flowing into the filter assembly 102 via the intake duct 104. Specifically, in several embodiments, the pre-cleaner 106 may include a plurality of tubes (e.g., turbo tubes), dirt separators, and/or any other suitable pre-cleaner elements 114 configured to separate particulates from the air via centripetal force. For example, the pre-cleaner elements 114 may be configured to impart a vortex or spinning motion to the flow of air entering the filter assembly 102. As a result, large particulates contained within the air may be forced radially outwardly along the inner wall of the pre-cleaner housing 110 by the centripetal force of the vortex/spinning motion. These large particulates may then be expelled from the filter assembly 102 via an outlet port 116 defined in the pre-cleaner housing 110.

Additionally, the air filter 108 may generally be configured to receive the cleaned air flowing from the pre-cleaner 106 and filter such air to provide a final stage of filtering prior to delivery of the air to the engine 22. Thus, as shown in FIG. 2, the air filter 108 may generally include one or more filter elements 118 configured to catch or trap the remaining particulates contained within the cleaned air. For instance, in several embodiments, the filter element(s) 118 may be made from a fibrous, porous or mesh material that allows air to pass therethrough while catching/trapping any particulates. The cleaned/filtered air may then be directed through a suitable conduit 120 to the engine 22, where the air may be mixed with fuel and combusted.

Referring still to FIG. 2, the system 100 may also include a fluid conduit 140 in flow communication between the pre-cleaner 106 and a double-walled flow pipe 142 to provide a flow path for directing an aspirated airflow (indicated by the labeled, solid arrows 144 in FIG. 2) from the pre-cleaner 106 to the double-walled flow pipe 142. Specifically, as shown in FIG. 2, the fluid conduit 140 may include a first end 146 in flow communication with the outlet port 116 of the pre-cleaner 106 and a second end 148 in flow communication with an aspiration port 150 defined in the double-walled flow pipe 142. As such, the aspirated airflow 144 expelled from the outlet port 116 of the pre-cleaner 106 (including the particulates expelled therefrom) may be directed through fluid conduit 140 to the double-walled flow pipe 142.

It should be appreciated that, as described herein, the fluid conduit 140 may be formed from a single flow conduit defining a flow path between the pre-cleaner 106 and the double-walled flow pipe 142 or the fluid conduit 140 may be formed from two or more flow conduits coupled together to define a flow path between the pre-cleaner 106 and the double-walled flow pipe 142.

As shown in FIG. 2, the double-walled flow pipe 142 may generally include an inner tube 152 and an outer tube 154 surrounding the inner tube 152 such that an annular passage 156 is defined between the inner and outer tubes 152, 154. The inner tube 152 may generally be configured to receive a primary fluid flow of the work vehicle 10 (indicated by dashed arrows 158), including any suitable gas flow associated with the work vehicle 10 and/or any suitable liquid flow associated with the work vehicle 10. Specifically, in one embodiment, the primary fluid flow 158 may correspond to an engine exhaust flow of the work vehicle 10. In such an embodiment, the inner tube 152 may, for example, correspond to all or a portion of one of the exhaust pipes of the work vehicle 10 (e.g., exhaust pipes 30, 32 shown in FIG. 1) or the inner tube 152 may be provided in flow communication with such engine exhaust pipes. In another embodiment, the primary fluid flow 158 may correspond to a compressed airflow of the work vehicle 10, such as a compressed charge airflow of the work vehicle 10. Alternatively, the primary fluid flow 158 may correspond to a liquid coolant flow of the work vehicle 10. For instance, the primary fluid flow 158 may include water, oil, refrigerant, or any other suitable liquid coolant utilized within the work vehicle 10.

Additionally, the annular passage 156 defined between the inner and outer tubes 152, 154 may generally be configured to receive the aspirated airflow 144 from the pre-cleaner 106. Specifically, in several embodiments, the aspiration port 150 may be defined through the outer tube 154 of the double-walled flow pipe 142, thereby providing a flow path between the fluid conduit 140 and the annular passage 156. The aspirated airflow 144 directed through the fluid conduit 140 may then enter the double-walled flow pipe 142 and flow in a flow direction (indicated by arrow 160) through the annular passage 156 as the primary fluid flow 158 is flowing through the inner tube 152.

As will be described below, the annular passage 156 may provide a flow path for coupling the fluid conduit 140 (and, thus, the pre-cleaner 106) to a downstream vacuum source that is configured to apply a vacuum within the flow path that generates the aspirated airflow 144 by sucking the particulates flowing along the inner wall of the pre-cleaner housing 110 out the outlet port 116 and through the fluid conduit 140. For instance, in one embodiment, the vacuum source may be incorporated within the double-walled flow pipe 142, such as by including a venturi section within the inner tube 152. Alternatively, the vacuum source may be located separate or spaced apart from the lengthwise portion of the double-walled flow pipe 142 along which the aspirated airflow 144 is being directed. For instance, as will be described below with reference to FIG. 4, in one embodiment, the double-walled flow pipe 144 may include a vacuum port 288 downstream of the aspiration port 150 through which the aspirated airflow 144 is expelled from the double-walled flow pipe 142 as it is being directed towards the vacuum source.

Given this configuration, the double-walled flow pipe 142 may serve a dual-function. Specifically, the inner tube 152 of the double-walled flow pipe 142 may provide a flow path for the primary fluid flow 158 of the work vehicle 10. Additionally, the annular passage 156 defined between the inner and outer tubes 152, 154 may serve as a flow path for the aspirated airflow 144 directed between the pre-cleaner 106 and the vacuum source being applied through the flow path. As a result, the number and/or length of the fluid hoses and/or other couplings typically used to fluidly couple the pre-cleaner 106 to the vacuum source may be reduced, which may reduce the overall cost of the aspiration system and/or provide additional packaging space within the work vehicle 10.

Referring now to FIG. 3, a cross-sectional view of one embodiment of a suitable configuration of a portion of the double-walled flow pipe 142 described above with reference to FIG. 2 is illustrated in accordance with aspects of the present subject matter. In this regard, the same reference characters used in FIG. 2 will be used to identify the same or similar components of FIG. 3. As described above, the double-walled flow pipe 142 may include an inner tube 152 and an outer tube 154 surrounding the inner tube 152 such that an annular passage 156 is defined between the inner and outer tubes 152, 154. Additionally, the double-walled flow pipe 142 may include an aspiration port 150 defined through the outer tube 154 for receiving an aspirated airflow (indicated solid arrows 144) directed through a fluid conduit 140 from the pre-cleaner 106 (FIG. 2).

In several embodiments, a vacuum source may be incorporated into the double-walled flow pipe 142 for generating a vacuum to be applied to the annular passage 156 and the fluid conduit 140 for sucking particulates out of the pre-cleaner 106. As shown in FIG. 3, in one embodiment, the vacuum source may correspond to a venturi section 170 included within the inner tube 152. The venturi section 170 may generally be formed by a converging section 172 along which the cross-sectional flow area of the inner tube 152 is reduced from its upstream flow area and a diverging section 174 downstream of the converging section 172 along which the cross-sectional flow area of the inner tube 152 is increased (e.g., back to the original upstream flow area). Such narrowing of the cross-sectional flow area of the inner tube 152 results in the flow velocity of the primary fluid flow (indicated by dashed arrows 158) increasing through the venturi section 170, thereby creating an area of low pressure within the venturi section 170 that may be used to generate a vacuum.

It should be appreciated that the venturi section 170 may be formed from any suitable structure and/or component. For example, in the illustrated embodiment, the venturi section 170 is formed integrally with the inner tube 152. In another embodiment, the venturi section 170 may correspond to a separate component(s) coupled to the inner tube 152 to form the desired venturi.

As shown in FIG. 3, the double-walled flow pipe 152 may also include a vacuum tube 176 to provide a fluid coupling between the annular passage 156 and the venturi section 170, thereby allowing the low pressure area formed within the venturi section 170 to be applied as a vacuum through the annular passage 156. Specifically, the vacuum tube 176 may extend between an inlet 178 defined through the inner tube 152 and an outlet 180 positioned within the venturi section 170. For example, the outlet 180 may be configured to be generally aligned with the narrowed section of the flow path defined between the converging and diverging sections 172, 174 of the venturi section 170. As such, the low pressure area with the venturi section 170 may apply a vacuum at the outlet 180 of the vacuum tube 176, which may, in turn, be applied to the flow path defined by the annular passage 156 and the fluid conduit 140 coupled thereto. Accordingly, the vacuum may serve to generate the aspirated airflow 144 at the outlet port 116 of the pre-cleaner 106 (FIG. 2). The aspirated airflow 144 (including the expelled particulates) may then be directed through the fluid conduit 140 and into the annular passage 156 via the aspirator port 150. The aspirated airflow 144 flowing through the annular passage 156 may then flow along a lengthwise distance 182 defined between the aspirator port 150 and the downstream inlet 178 of the vacuum tube 176 prior to entering the vacuum tube 176. Thereafter, the aspirated airflow 144 may be expelled from the outlet 180 of the vacuum tube 176 into the primary fluid flow 158 flowing through the inner tube 152.

It should be appreciated that, in the illustrated embodiment, it may be desirable for the primary fluid flow 158 to correspond to a fluid flow that is being expelled from the work vehicle 10. For instance, in several embodiments, the primary fluid flow 158 may correspond to the exhaust gas flow from the engine 22 (FIG. 2). In such an embodiment, the aspirated airflow 144 (including the particulates) may be expelled from the vacuum tube 176 and mixed with the engine exhaust flow. The mixture of the aspirated airflow 144 and the engine exhaust flow may then be expelled from the work vehicle 10 (e.g., via the exhaust pipe 32 shown in FIG. 1).

It should also be appreciated that the double-walled flow pipe may also be configured to include suitable sealing mechanisms 184 provided between the inner and outer tubes 152, 154 to minimize losses of the vacuum within the annular passage 156 and to ensure that the aspirated airflow 144 is directed from the fluid conduit 140 to the vacuum tube 176. In one embodiment, the sealing mechanisms 184 may be configured to form a slip joint so as to provide the desired sealing while also allowing relative motion between the inner and outer tubes 152, 154.

Referring now to FIG. 4, a cross-sectional view of another embodiment of a suitable configuration of a portion of the double-walled flow pipe 142 described above with reference to FIG. 2 is illustrated in accordance with aspects of the present subject matter. In this regard, the same reference characters used in FIG. 2 will be used to identify the same or similar components of FIG. 4. As described above, the double-walled flow pipe 142 may include an inner tube 152 and an outer tube 154 surrounding the inner tube 152 such that an annular passage 156 is defined between the inner and outer tubes 152, 154. Additionally, the double-walled flow pipe 142 may include an aspiration port 150 defined through the outer tube 154 for receiving an aspirated airflow (indicated solid arrows 144) directed through a fluid conduit 140 from the pre-cleaner 106 (FIG. 2).

As shown in FIG. 4, unlike the embodiment described above with reference to FIG. 3, the double-walled flow pipe 142 is configured to serve primarily as a flow path for the aspirated airflow 144 between the fluid conduit 140 and a downstream vacuum source 286. Specifically, in several embodiments, the double-walled flow pipe 142 may include a vacuum port 288 located downstream of the aspirator port 150. As shown in FIG. 4, the vacuum port 288 may be defined through the outer tube 154 and may be in flow communication with a vacuum tube 290 providing a flow path between the vacuum port 288 and the vacuum source 286. Thus, the aspirated airflow 144 flowing through the fluid conduit 140 from the pre-cleaner 106 may be directed into the annular passage 156 via the aspirator port 150. The aspirated airflow 144 flowing through the annular passage 156 may then flow along a lengthwise distance 292 defined between the aspirator port 150 and the downstream vacuum port 288 as the primary fluid flow (indicated by dashed arrows 158) is flowing through the inner tube 152. Thereafter, the aspirated airflow 144 may be expelled from the double-walled flow tube 142 via the vacuum port 288 and flow through vacuum tube 290 towards the downstream vacuum source 286.

It should be appreciated that, in the embodiment shown in FIG. 3, the vacuum source 286 may correspond to any suitable vacuum source to which the vacuum tube 290 may be fluidly coupled. For instance, in one embodiment, the vacuum source 286 may correspond to a venturi section formed in a separate pipe or tube of the work vehicle 10. Alternatively, the vacuum source 286 may correspond to a venturi section formed in a downstream portion of the double-walled flow pipe 142. For example, the portion of the double walled flow pipe 142 shown in FIG. 3 may correspond to a downstream portion of the double-walled flow pipe 142 shown in FIG. 4. In such an embodiment, the vacuum tube 290 shown in FIG. 4 may provide a flow path between the vacuum port 288 and the aspirator port 150 shown in FIG. 3.

In another embodiment, the vacuum source 286 may correspond to any other suitable vacuum source. For instance, the vacuum source 286 may correspond to a specific aspirator device, such as a blower, fan module, or vacuum pump, that is configured to be fluidly coupled to the double-walled flow pipe 142 via the vacuum tube 290. Alternatively, the vacuum source 286 may correspond to another component of the work vehicle 10. For instance, the vacuum source 286 may correspond to a cooling fan of the work vehicle 10, such as the fan positioned adjacent to the heat exchangers of the work vehicle 10. In such an embodiment, the vacuum tube 290 may be fluidly coupled between the double-walled flow pipe 142 and the fan (e.g., by placing the vacuum tube 290 in flow communication with a port or opening defined in a fan shroud surrounding the fan) to allow the vacuum generated by the fan to be used to aspirate the pre-cleaner 106.

Similar to the embodiment described above with reference to FIG. 3, it should be appreciated that the double-walled flow pipe 142 may be configured to include suitable sealing mechanisms 184 between the inner and outer tubes 152, 154 to minimize loss of the vacuum within the annular passage 156 and to ensure that the aspirated airflow 144 is directed from the fluid conduit 140 to the vacuum tube 290. As indicated above, in one embodiment, the sealing mechanisms 184 may be configured to form a slip joint so as to provide the desired sealing while also allowing relative motion between the inner and outer tubes 152, 154.

As indicated above, it should be appreciated that the present subject matter is also directed to a method for aspirating a pre-cleaner 106 of a work vehicle 10. In several embodiments, the method may include applying a vacuum to an annular passage 156 of a double-walled flow pipe 142 that is in fluid communication with an outlet 116 of the pre-cleaner 106. In addition, the method may include generating an aspirated airflow 144 via the vacuum that is directed from the outlet 116 of the pre-cleaner 106 to the annular passage 156 and flows through the annular passage 156 as a primary fluid flow 158 is flowing through an inner tube 152 of the double-walled flow pipe 142. Moreover, in one embodiment, the method may include directing the aspirated airflow 144 into the inner tube 152 such that the aspirated airflow 144 is mixed with the primary fluid flow 158 flowing through the inner tube 152. Similarly, in one embodiment, the method may include expelling the aspirated airflow 144 from the double-walled flow pipe 142 via a vacuum port 288 defined through an outer tube 154 of the double-walled flow pipe 142.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for aspirating a pre-cleaner of a work vehicle, the system comprising:
    a fluid conduit configured to be in flow communication with an outlet port of the pre-cleaner for receiving an aspirated airflow from the pre-cleaner; and
    a double-walled flow pipe, comprising:
        an inner tube configured to receive a primary fluid flow of the work vehicle, the primary fluid flow differing from the aspirated airflow; and
        an outer tube surrounding the inner tube such that an annular passage is defined between the inner and outer tubes, the annular passage being in flow communication with the fluid conduit;
        a vacuum tube extending between an inlet defined in the inner tube and an outlet positioned within the inner tube, wherein the vacuum tube is in flow communication with the annular passage;
    wherein, when a vacuum is applied to the annular passage, the aspirated airflow is drawn through the fluid conduit from the pre-cleaner and is directed to the outlet of the vacuum tube through the annular passage and the vacuum tube, the aspirated airflow flowing through the annular passage and the vacuum tube as the primary fluid flow is being directed through the inner tube.

2. The system of claim 1, further comprising a vacuum source in flow communication with the annular passage, the vacuum source configured to generate the vacuum for drawing the aspirated airflow through the fluid conduit.

3. The system of claim 2, wherein the vacuum source corresponds to a venturi section provided in association with the inner tube.

4. The system of claim 2, wherein, when the primary fluid flow is directed through the venturi section of the inner tube, the vacuum is applied to the vacuum tube to draw the aspirated airflow through the fluid conduit to the annular passage, the aspirated airflow flowing through the annular passage being diverted through the vacuum tube and expelled therefrom into the primary fluid flow through the inner tube.

5. The system of claim 4, wherein the outlet is positioned adjacent to a narrowed portion of a flow path through the inner tube defined within the venturi section.

6. The system of claim 2, wherein the fluid conduit is in flow communication with an aspiration port defined through the outer tube at a location upstream of the vacuum port.

7. The system of claim 6, wherein the vacuum port is spaced apart from the aspiration port along the double-walled flow pipe by a lengthwise distance, the aspirated airflow configured to flow through the annular passage from the aspiration port to the vacuum port along the lengthwise distance as the primary fluid flow is being directed through the inner tube.

8. The system of claim 1, wherein the primary fluid flow corresponds to a gas flow or a liquid flow of the work vehicle.

9. The system of claim 8, wherein the gas flow corresponds to an exhaust gas flow or a compressed airflow of the work vehicle.

10. The system of claim 8, wherein the liquid flow corresponds to a liquid coolant flow of the work vehicle.

11. The system of claim 8, further comprising at least one sealing mechanism provided between the inner and outer tubes.

12. A system for aspirating a pre-cleaner of a work vehicle, the system comprising:
    a fluid conduit configured to be in flow communication with an outlet port of the pre-cleaner for receiving an aspirated airflow from the pre-cleaner; and
    a double-walled flow pipe, comprising:
        an inner tube configured to receive an exhaust flow of the work vehicle, the inner tube including a venturi section;
        an outer tube surrounding the inner tube such that an annular passage is defined between the inner and outer tubes, the annular passage being in flow communication with the fluid conduit; and
        a vacuum tube extending between an inlet defined in the inner tube and an outlet positioned within the inner tube, the vacuum tube providing a flow path between the annular passage and the venturi section of the inner tube, wherein, when the exhaust flow is directed through the venturi section, a vacuum is generated within the vacuum tube that draws the aspirated airflow through the fluid conduit to the annular passage, the aspirated airflow flowing through the annular passage to the vacuum tube and being expelled therefrom into the exhaust flow through the inner tube.

13. The system of claim 12, wherein the outlet is positioned within the inner tube adjacent to a narrowed portion of a flow path through the inner tube defined within the venturi section.

* * * * *